United States Patent
Martin et al.

[15] 3,701,936
[45] Oct. 31, 1972

[54] FINE & COARSE SYNCHRO SERVOMOTOR CONTROL INCLUDING A DUAL SIN/COSINE TO DC CONVERTER

[72] Inventors: Kenneth G. Martin, Cedar Rapids; Paul A. Seuferer, Baltic, both of S. Dak.

[73] Assignee: Collins Radio Company, Cedar Rapids, S. Dak.

[22] Filed: Dec. 10, 1971

[21] Appl. No.: 206,603

[52] U.S. Cl. .................. 318/595, 318/654, 318/661
[51] Int. Cl. ........................................... G05b 11/18
[58] Field of Search ..................... 318/595, 654, 661

[56] References Cited

UNITED STATES PATENTS

| | | | |
|---|---|---|---|
| 2,409,970 | 10/1946 | Agins | 318/595 |
| 3,100,859 | 8/1963 | Bentkowsky | 318/595 |
| 3,141,121 | 7/1964 | Moody et al. | 318/595 |
| 3,166,698 | 1/1965 | Moser et al. | 318/595 |
| 3,178,663 | 4/1965 | Kahn | 318/595 X |

FOREIGN PATENTS OR APPLICATIONS 601,518   5/1948   Great Britain .............. 318/595

*Primary Examiner*—T. E. Lynch
*Attorney*—Richard W. Anderson et al.

[57] ABSTRACT

Dual-synchro coarse and fine error signals definitive of the discrepancy between a selected condition and that being experienced are converted by static means to a linear DC control signal. Linearization means implementing the control function $1 - \cos \theta + |\sin \theta|$ are employed as concerns the fine error analog input signal, and the coarse error analog input signal is employed for switching functions which occur only at zero error and control extremes, thus obviating control discontinuities, transients, and sudden changes in control linearity.

12 Claims, 4 Drawing Figures

FINE & COARSE SYNCHRO SERVOMOTOR CONTROL INCLUDING A DUAL SIN/COSINE TO DC CONVERTER

This invention relates generally to control systems and more particularly to a method and means for converting coarse-fine synchro error angle information to a linear DC function for control purposes.

While the present invention will be described in the environment of the formulation of a linear DC control signal for aircraft altitude control, the invention in general may be utilized in any control system of a type which accepts dual (coarse and fine) synchro angular error analog information and converts same to a linear DC output control signal.

Again within the environment of flight control systems which formulate command signals to maintain altitude control of an aircraft, the central air data computer or altimeter instrument of the present state of the art typically furnishes fine and coarse altitude signals on six wires (three wires each) which are fed into an altitude preselect controller which contains electromechanical means, such as transolvers or differential resolvers, to develop coarse and fine sine and cosine output signals which collectively define the difference between an actual altitude being experienced by the craft and a preselected altitude. For example, known central air data computers may contain aneroid diaphragms acted upon by static and pitot pressures. Displacement of the diaphragms unbalances sensitive AC variable transformers that are part of closed servo loops. The movement of servo gear trains to restore balance develops analogs of altitude. The "altitude analog" gear train of such devices may then drive shaft devices, such as synchro transmitters, that provide altitude information to external systems. Typically, coarse and fine synchro transmitters may be geared with appropriate drive ratios to the altitude analog shaft in such systems to provide output signals representing three wire analog signals which collectively define an angle which is the analog of the experienced altitude. Predefined scaling factors may define, for example, 5,000 ft. per revolution of the fine synchro and 135,000 ft. per revolution of the coarse synchro, establishing a gear ratio between the two synchro drives of 27:1. Thus, as the experienced altitude varies, the fine synchro may be driven through one revolution for every 5,000 ft. of altitude change while the coarse synchro is driven through a complete revolution for 135,000 ft. of altitude change.

Each of the synchro transmitter outputs might be applied to further electromechanical resolvers in appropriate position servo loops to develop a single shaft position which is an analog of altitude. This shaft position may, for example, drive a potentiometer to, in turn, provide an output voltage in the form of a linear DC signal for command purposes.

The object of the present invention is the provision of solid state means whereby the aforedefined fine and coarse sine and cosine error analog signal may be converted into a linear DC control signal over a predetermined control range in a completely static system having the inherent advantages of reduced weight and volumetric requirements, simplicity, and increased reliability over known electromechanical approaches.

The present invention is featured in the provision of a synchro to linear converter means utilizing input signals proportional respectively to the sine and cosine of the error signal defined by each of fine and coarse error synchro inputs. The converter mechanizes the function $V_{out} = 1 - \cos\theta + |\sin\theta|$.

In accordance with the general operation of the present invention the fine error is utilized to compute the linear DC output signal and the coarse error is utilized for switching functions. A further feature of the present invention is the provision of a converting system of the above-defined type wherein no switching or signal fading of any kind from one source to another is required over the entire usable range.

A further object of the present invention is the provision of a means for converting from dual synchro error analog information to a linear DC function permitting mechanization to fit various fine/coarse scaling factors employed in the input transducer source.

These and other features and objects of the present invention will become apparent upon reading the following description with reference to the accompanying drawing in which.

The present invention will be described in the environment of aircraft flight control in the form of means to convert altitude error analog signals originating from fine and coarse synchro transmitters into a linear DC signal that can be used to form a command signal in a flight control system and/or to provide alarm signals for altitude alerting.

Figure 1:
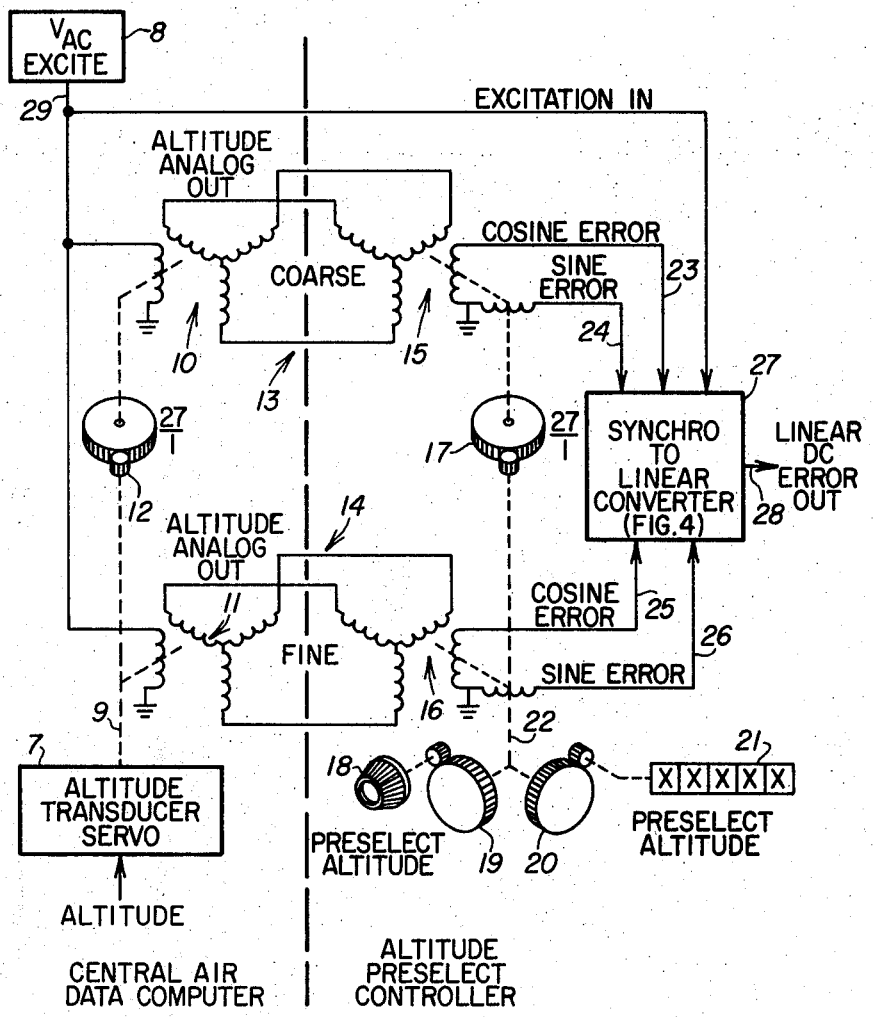
FIG. 1 is a functional diagram of a control signal conversion system in accordance with the present invention.

A typical central air data computer or altimeter instrument is functionally depicted in FIG. 1. An altitude transducer servo 7 drives shaft 9 to a rotational position which is an analog of the experienced altitude. Rotation of shaft 9 is imparted to the rotors of first and second synchro transmitters 10 and 11. The rotors of the synchro transmitters 10 and 11 are excited from the output 29 of a synchro carrier excitation source 8 which might typically be 26 volts, 400 Hz. The three-wire outputs 13 and 14 from the synchro transmitters 10 and 11 conventionally comprise three-phase signals which collectively define the angle corresponding to the altitude analog angle defined by shaft 9. The fine synchro transmitter 11 might be driven directly by shaft 9 and the coarse angle synchro transmitter 11 may be driven through a 27:1 gear ratio 12. In a typical central air data computer the most common scaling factors employed are defined per specification ARINC 565 as 5,000 ft. of altitude per revolution of the fine synchro 11 and 135,000 ft. per revolution of the coarse synchro 10, thus establishing the gear ratio of 27:1.

The three-wire outputs 13 and 14 from the coarse and fine synchro transmitter may then typically be applied to an altitude preselect controller where they provide respective inputs for transolvers 15 and 16. The rotor of transolver 15 comprises a pair of quadrature phased windings as does the rotor of transolver 16. The respective transolver rotors may be positioned by rotation of a preset altitude control 18. Rotation of knob 18 is imparted through appropriate gear drive 19 as a rotational input 22 applied directly to the dual winding rotor of transolver 16 and through a 27:1 ratio drive 17 to the rotor of transolver 15. The preset altitude is typically imparted through further appropriate gear drive means 20 to a preset altitude indicator 21. With this arrangement the rotors of the transolvers 15 and 16 develop output signals respectively proportional to the sine and cosine of the analog error angle between the preset altitude as selected by the pilot by rotation of knob 18 and the experienced altitude as imparted to the transolvers 15 and 16 by the respective coarse and fine synchro transmitters 10 and 11 in the central air data computer. Any error between a preselected altitude to be flown and that actually experienced appears as a coarse and fine error output signals each in the form of cosine and sine functions respectively of the error "angle," which angle in turn is established by the analog scaling factor of the system.

In accordance with the present invention the coarse sine and cosine error outputs 23 and 24 from the respective rotor windings of transolver 15 represent functions of an error analog angle which goes through 360° as the coarse synchro transmitter 10 is driven through one revolution for each 135,000 ft. of altitude change. Similarly, the fine sine and cosine error outputs 25 and 26 from transolver 16 are functions of an error analog angle which goes through 360° as the fine synchro transmitter 11 is driven one revolution for each 5,000 ft. of altitude change.

The synchro carrier excitation signal 29 from source 8, together with the fine and coarse cosine and sine error signals from the preselect controller are applied to a synchro-to-linear converter 27 the output 28 of which comprises a linear DC voltage of a first polarity for selected altitude in excess of that actually being experienced and of an opposite polarity for selected altitudes less than that actually experienced. The fine error collectively defined by the sine and cosine outputs 25 and 26 of the rotor winding of transolver 16 are utilized to compute a linear DC output signal and the coarse error, as collectively defined by the rotor outputs 23 and 24 from transolver 15, is utilized for switching functions.

The coarse and fine cosine and sine error input signals to linear converter 27 are applied as inputs to a circuitry by means of which the function $V_{out} = 1 - \cos\theta + |\sin\theta|$ is mechanized. As depicted in Table I below and plotted in FIG. 3, the function $V_{out} = 1 - \cos\theta + |\sin\theta|$ is reflected about the zero error degree axis and maximizes at 135° of fine synchro error angle thus defining a usable range of 135° of fine synchro rotation (1,875 ft) with reasonable linearity up to 100° (1,400 ft.). As will be further described, the symmetrical reflection of the control function about the zero error angle axis is converted to a linear function of first polarity for error angles corresponding to selected altitudes in excess of that experienced and to an opposite polarity for selected altitudes less than that actually experienced by the employment of appropriate switching at the zero error angle point to effect appropriate polarity inversion.

| Error $\theta$ | Sin $\theta$ | Cos $\theta$ | 1 − Cos $\theta$ | 1 − Cos $\theta$ + Sin $\theta$ |
|---|---|---|---|---|
| +180° | 0.000 | −1.000 | 2.000 | 2.000 |
| +150° | 0.500 | −0.866 | 1.866 | 2.366 |
| (max)+135° | 0.707 | −0.707 | 1.707 | 2.414 |
| +120° | 0.866 | −0.500 | 1.500 | 2.366 |
| +90° | 1.000 | 0.000 | 1.000 | 2.000 |
| +60° | 0.866 | 0.500 | 0.500 | 1.366 |
| +30° | 0.500 | 0.866 | 0.134 | 0.634 |
| 0° | 0.000 | 1.000 | 0.000 | 0.000 |
| −30° | −0.500 | 0.866 | 0.134 | 0.634 |
| −60° | −0.866 | 0.500 | 0.500 | 1.366 |
| −90° | −1.000 | 0.000 | 1.000 | 2.000 |
| −120° | −0.866 | −0.500 | 1.500 | 2.366 |
| −135° | −0.707 | −0.707 | 1.707 | 2.414 |
| −150° | −0.500 | −0.866 | 1.866 | 2.366 |
| −180° | 0.000 | −1.000 | 2.000 | 2.000 |

TABLE I

Referring again to Table I and FIG. 3, the control function is seen to be symmetrical about the zero error angle axis and of positive polarity for both positive and negative error angles corresponding respectively to selected altitudes above and below that actually being experienced.

Figure 4:
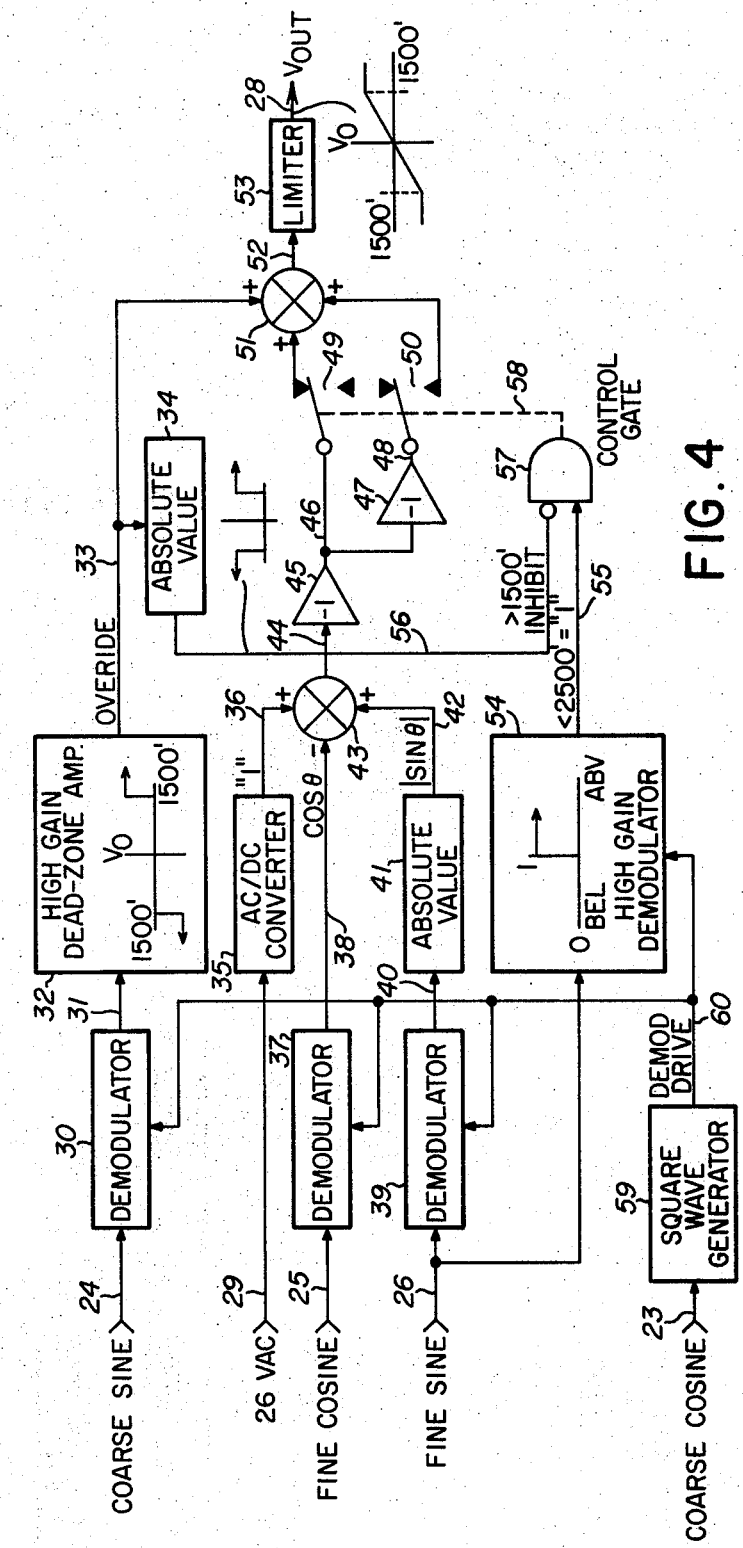
FIG. 4 is a functional diagram of a signal converting system in accordance with the present invention which converts dual sine and cosine error input analog information into a linear DC output control signal.

A means of mechanizing the control function $1 - \cos\theta + |\sin\theta|$ for use as a linear DC signal is indicated in the functional diagram of FIG. 4. It might be emphasized that the input error signals in the form of coarse and fine sine and cosine signals comprise transolver (or differential resolver) outputs and accordingly are comprised of a carrier signal (for example, 400 Hz) amplitude modulated in accordance with the sine and cosine functions. As the experienced altitude passes through the preset altitude, the transolver rotor outputs which comprise the error signals applied to the converter 27, characteristically reverse in phase. Thus, the converter of FIG. 4 includes synchronous phase sensitive demodulation means by means of which the modulation envelopes of the error signals are recovered. The modulation envelopes are processed through linearization means in accordance with the control function and appropriate polarity switching is employed to arrive at the desired linear DC output control function.

Figure 2:
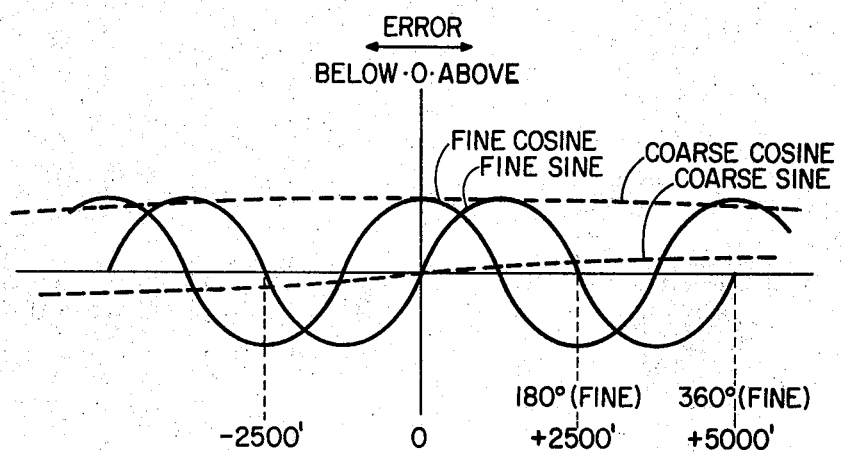
FIG. 2 illustrates coarse and fine sine and cosine waveforms as they apply to operation of the conversion system of the present invention.

The operation of FIG. 4 might best be comprehended by first considering the fine and coarse sine and cosine error signals which comprise the input parameters. These signals are depicted in FIG. 2. It is noted that the fine sine signal is of a considerably higher periodicy than the coarse sine signal. In the illustrated example, the fine sine signal has a periodicy 27 times greater than that of the coarse signal due to the scaling factor of one revolution of the fine synchro for 5,000 ft. of altitude and one revolution of the coarse signal for 127,500 ft. of altitude. The control to be effected is a linear DC control about a zero error axis which is defined by the preselected altitude set in by the operator. Thus, with the selection of any altitude to be flown within the range of the central air data computer, experienced altitudes in excess of that selected provide a DC output of a first polarity while experienced altitudes less than that selected provide a DC output of opposite polarity as defined by a linear DC function passing through the "zero" control axis corresponding to the selected altitude. It is apparent, then, that control function to be mechanized in the synchro-to-linear converter as depicted in FIG. 3, in being unipotential in nature, will necessitate polarity inversion about the zero error axis in order to accomplish the aforedefined objective.

Referring now to FIG. 4, the 400 Hz 26 volt AC synchro carrier excitation signal 29 is applied to an AC to DC converter 35 to develop the "1" analog as concerns the control function to be mechanized. By employing the same source used to excite the coarse and fine synchro transmitters in the central air data computer (FIG. 1) for this purpose, the "1" analog output 36 from AC to DC converter 35 is power normalized. The analog "1" output 36 is applied as a first input to a signal combining means 43. The cos θ term of the control function is developed by applying the fine cosine error signal 25 to a synchronous phase-sensitive demodulator 37 to recover the modulation envelope. Demodulator 37 is driven by demodulator drive signal 60 which is developed by applying the coarse cosine error signal 23 to a square wave generator 59. With reference to FIG. 2, the coarse cosine error signal is employed as a demodulator drive signal for purpose of synchronous demodulation since it is available (does not go to zero) and does not experience a phase reversal over the area of control to be effected. The coarse sine error input signal could not be used for demodulator drive purposes since with reference to FIG. 2, it by definition passes through zero and reverses in phase in the middle of the control function. The fine cosine modulation envelope is developed as the output 38 from demodulator 37 and applied in a subtractive sense as a second input to signal combining means 43. Demodulator 37 produces a DC output voltage proportional to the cosine envelope and with polarity representing plus or minus error degrees.

The | sin θ | analog term of the control function is developed by applying the fine sine error input 26 to a further synchronous phase-sensitive demodulator 39 which is also driven by source 60. The output 40 from demodulator 39 then comprises the fine sine modulation envelope and is applied to an absolute value circuitry 41 (which might comprise a precision rectifier) to develop an output 42 corresponding to |sin|θ. The output 42 is applied in an additive sense as a third input to signal combining means 43.

Figure 3:
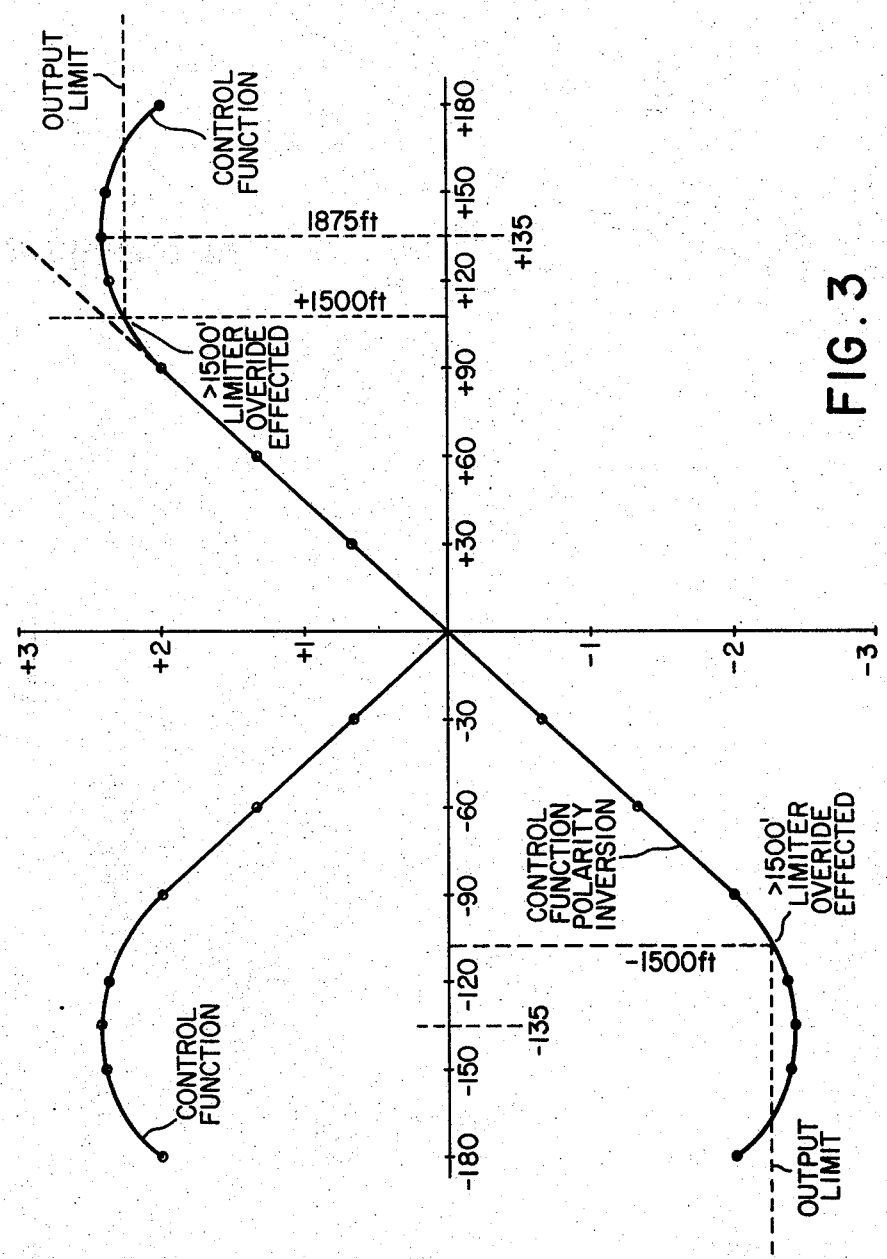
FIG. 3 is a diagrammatic representation of the linear control function upon which the system of the present invention is based.

The output 44 from signal combining means 43 then comprises a DC analog of the desired control function 1 − cos θ + |sin|θ and corresponds to the function as plotted in FIG. 3. It should be emphasized again that the control function per se, as plotted in FIG. 3, and as developed at the output 44 of signal mixing means 43, is not appropriate for control since it is reflected about the zero error axis and thus is of a single polarity. For the purpose of the present invention, appropriate switching means are employed to invert the polarity of the control function as it passes through the zero error axis. For this purpose, a double-pole switching means and appropriate switch drive logic are employed.

The output of signal combining means 43, which might comprise a conventional operational amplifier adder circuitry, is then always positive for both positive and negative error angles, as indicated in Table I and depicted diagrammatically in FIG. 3. Thus, amplifying means and switching means are employed to polarity invert this signal to a negative voltage in the proper quadrant. With reference to FIG. 4, the output 44 from signal mixing means 43 is applied to an inverting amplifier 45 the output 46 of which is selectively applied through a first switch means 49 as a first input to a further signal combining means 51. The output from inverting amplifier 45 is additionally applied to a further inverting amplifier 47 the output 48 of which is selectively applied through a second switching means 50 as a second input to signal mixing means 51.

The double-pole switching means 49-50 is energized by and "above" mode voltage which is generated by a high gain demodulator 54 which receives the fine sine error input signal 26 and functions to saturate for one input phase and produce no output for the other phase, it being remembered that the carrier of the transolver generated fine sine error signal will inherently reverse phase as the error reflects experienced altitudes one side or the other of that preselected. Output 55 from high gain demodulator 54 is applied to control gating means 57. The output 58 of gating means 57 drives switches 49 and 50.

Since the high gain demodulator 54 utilizes the fine sine signal 26, the output from the demodulator 54 will not be available above 180° (2,500 ft.). This is evidenced in the input control signal diagram of FIG. 2. Therefore, a mode voltage is generated any time the error is greater than 1,500 ft. and this mode voltage 56 is applied as an inhibiting input to control gating means 57 to inhibit or suppress polarity switching through switching means 49 and 50 for errors greater than 1,500 ft.

The output 52 from the signal combining means 51 is applied through a limiter 53 the output of which comprises the linear DC control signal 28. Limiter 53 establishes a voltage limit on the control signal for error signals in excess of 1,500 ft. Since the linear DC output signal must remain saturated for very large errors an override signal is generated and applied to signal combining means 51 such that the output 52 of the combining means, as applied to the limiter 53, effects limiter saturation for errors greater than 1,500 ft. The override signal is developed by applying the coarse sine error input signal 24 to a further synchronous phase-sensitive demodulator 30 which is driven by source 60 and develops an output 31 corresponding to the coarse sine error envelope. The output 31 from demodulator 30 is applied to a high gain dead-zone amplifier 32 which develops a saturated output when the coarse sine error signal input is in excess of 1,500 ft. The output 33 from the high gain dead-zone amplifier 32 then comprises the override signal input to the signal combining means 51 to assure saturation of output limiter 53 for error signals in excess of 1,500 ft. The output 33 from the high gain dead-zone amplifier 32 is additionally applied through an absolute value circuitry 34 to develop the aforedescribed inhibiting signal 56 for control gating means 57 to suppress polarity switching for errors greater than 1,500 ft.

It is to be realized that switch members 49-50 might comprise solid state semiconductor switching devices and that the switching arrangement as depicted in FIG. 3 is functional for purposes of explanation.

It might further be noted that, in the absence of the inhibit input to control unit 57 for error signal in excess of 1,500 ft., extremely large error signals would cause the output from high gain demodulator 54 to go to zero when the error exceeded 2,500 ft. since 2,500 ft. corresponds to one half cycle of the fine sine error input 26 which (with reference to FIG. 2) would reverse polarity as the error passed through 2,500 ft. and effect a polarity switching at this point which could not be tolerated in the control system. Thus, by inhibiting control gating means 57 for errors in excess of 1,500 ft. (the value chosen in the example as effecting the most reasonable linearity throughout the control range) this intolerable polarity switching is obviated.

The override signal 33 applied to the output signal combining means 51 is necessary to maintain the control on the positive slope portion of the control function utilized. With reference to FIG. 3, this control function is not usable beyond 135° of error, since the function maximizes at this point and the control sensing in the absence of an override would reverse for errors in excess of 135°. The override is effected, therefore, at 1,500 ft. which is defined in the system as being the usable range over which maximum linearity is experienced and uniquely the absolute value of this override signal provides the desired inhibit signal for polarity switching of the control function as it is applied to the output signal combining means.

The present invention is thus seen to provide a means for converting dual sine-cosine defined analog error signals to a linear DC control function without the employment of electromechanical servo techniques. Although the usable range for the control function described is limited to plus or minus 135° of fine synchro rotation, the conversion method offers the advantage of permitting mechanization to fit nearly any fine/coarse gear ratio and is particularly advantageous in mechanization for the ARINC 565 ratio of 27:1.

The conversion method further employs no signal source switching or signal fading functions over the entire usable range. Since all "switching" is done at zero error and at the extreme ends of the range, the described system obviates control discontinuities, transients, and sudden changes in linearity, as generally are experienced in other linearization methods. For example, linearization methods which employ diodes or other fade-in devices to supplement the fine signal above its 90° point have the disadvantage of degradation in linearity at the 90° point in spite of carefully hand selected components. While obtainment of a DC control signal with usable linearity over a predetermined range in a coarse and fine synchro control system as herein described might sidestep the problem areas of switching transients and signal fade-in devices by changing the scaling factors on the fine and coarse synchros, this approach would necessitate that a nonstandard altitude sensor and differential synchro devices be employed.

Although the present invention has been described with respect to a particular embodiment thereof, namely as usable in an altitude control system with altitude transducer input parameters, it is to be realized that the invention is equally applicable to other control systems wherein an input parameter is defined by a shaft position analog and used to drive synchro transmitters with appropriate scaling factors to define coarse and fine three-wire analog outputs. Thus, changes might be made which fall within the scope of the invention as defined in the appended claims.

We claim:

1. Control signal development means for developing a linear DC error output signal from an angular error analog input signal source, said input signal source providing an error signal output proportional to the discrepancy between a condition command and an experienced condition, said error signal input comprising first, second, third, and fourth signals, said first and second signals comprising a carrier signal with amplitude modulation proportional respectively to sin $\theta$ and cos $\theta$, where $\theta$ is an error analog angle and with respective opposite carrier phase for values of $\theta$ reflecting experienced conditions respectively above and below said commanded condition, said third and fourth input signals exhibiting sinusoidal and cosinusoidal amplitude modulations at a rate 1/N where N is the cyclic rate of said first and second signals, means for converting said first, second, third, and fourth error signals to a single linear DC output control signal comprising means for demodulating said first and second signals, signal conversion means receiving said demodulated first and second signals and a predetermined direct current signal source and developing therefrom a unipotential DC output signal proportional to the control function $1 - \cos\theta + |\sin\theta|$, an output terminal, and means for selectively inverting the polarity of the output from said signal conversion means as applied to said output terminal as a function of the carrier phase of said first input signal.

2. Means as defined in claim 1 wherein said first and second and said third and fourth ones of said input signals defining said angular error analog input signal comprises the respective paired outputs of first and second differential resolvers the stator windings of which are connected to respective ones of first and second three-wire synchro signal sources definitive of said experienced condition and the rotor windings of which are selectively rotatably positionable with respect to the stator windings by an angular degree definitive of said commanded condition.

3. Means as defined in claim 1 further comprising means for limiting the output of said signal conversion means as applied to said output terminal, means for demodulating said third input signal, limiter override signal development means responsive to said demodulated third input signal to develop an output of predetermined magnitude for amplitudes of said third input signal in excess of a predetermined level, means for combining said override signal with the output of said signal conversion means as applied to said means for limiting, and the magnitude of said limiter override signal being in excess of the limiting threshold of said means for limiting.

4. Means as defined in claim 2 further comprising means responsive to said limiter override signal to inhibit said polarity inversion of the output of said signal conversion means.

5. Means as defined in claim 4 wherein said means for inhibiting comprises gating means receiving the output of said high gain demodulator and providing an activating output to said first and second switch means in the absence of an inhibiting signal input thereto, said inhibiting signal input comprising the output of means to derive the absolute value of the output from said limiter override signal development means.

6. Means as defined in claim 4 wherein said predetermined DC source signal as utilized in said signal conversion means comprises the output from means for converting the carrier excitation source for said first, second, third, and fourth input signals to a direct current voltage.

7. Means as defined in claim 4 wherein said limiter override signal development means comprises a high gain dead-zone amplifier receiving said demodulated third input signal as an input thereto.

8. Means as defined in claim 7 wherein said means for polarity inversion comprises a high gain demodulator means receiving said first input signal and developing an output of predetermined magnitude in response to said input signal exhibiting a first phase and zero output in response to said first input signal exhibiting a phase opposite said first phase, said polarity inversion means being responsive to said predetermined magnitude output of said high gain demodulator to effect said polarity inversion of the output of said signal conversion means.

9. Means as defined in claim 8 wherein said signal polarity inversion means comprises a first switch means, a first inverting amplifier serially connected between the output of said signal conversion means and said first switch means, a second switch means, a second inverting amplifier serially connected between the output of said first inverting amplifier and said second switch means, said first and second switch means being responsive to zero output from said high gain demodulator to connect the output of said first inverting amplifier to said output terminal and being responsive to said predetermined magnitude output from said high gain demodulator to connect the output from said second inverting amplifier to said output terminal.

10. Means as defined in claim 9 wherein said predetermined magnitude output from said dead-zone amplifier is developed in response to said fourth input signal amplitude modulation being proportional to an angular error corresponding to less than one-third cycle of the amplitude modulation components of said first and second input signals.

11. Means as defined in claim 10 wherein each of said demodulating means has applied thereto a demodulator drive input signal having a frequency and phase corresponding to that of said fourth input signal.

12. Means as defined in claim 11 wherein each of said signal demodulating means provides an output signal of amplitude proportional to that of the amplitude modulated carrier input signal thereto and of a polarity corresponding to the phase of the carrier signal applied thereto.

* * * * *

UNITED STATES PATENT OFFICE
CERTIFICATE OF CORRECTION

Patent No. 3,701,936    Dated October 31, 1972

Inventor(s) Kenneth G. Martin and Paul A. Seuferer

It is certified that error appears in the above-identified patent and that said Letters Patent are hereby corrected as shown below:

Column 4, line 6 - Last heading in Table I should read -- $1 - \cos\theta + |\sin\theta|$ --

Column 5, line 50 - "|sin| $\theta$" should read -- $|\sin\theta|$ -- line 55 - "|sin| $\theta$" should read -- $|\sin\theta|$ --

Signed and sealed this 22nd day of May 1973.

(SEAL)
Attest:

EDWARD M. FLETCHER, JR.
Attesting Officer

ROBERT GOTTSCHALK
Commissioner of Patents